(12) United States Patent
Maki

(10) Patent No.: US 8,671,157 B2
(45) Date of Patent: Mar. 11, 2014

(54) SYSTEM AND METHOD FOR OPTIMIZING NAME-RESOLUTION OVERHEAD IN A CACHING NETWORK INTERMEDIARY DEVICE

(75) Inventor: Eric Maki, Ontario (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 223 days.

(21) Appl. No.: 13/218,348

(22) Filed: Aug. 25, 2011

(65) Prior Publication Data

US 2013/0054671 A1 Feb. 28, 2013

(51) Int. Cl.
*G06F 15/16* (2006.01)
*G06F 7/04* (2006.01)

(52) U.S. Cl.
USPC ............................................ 709/217; 726/26

(58) Field of Classification Search
USPC ............... 709/225–226, 217–219; 726/30, 26
See application file for complete search history.

(56) References Cited

U.S. PATENT DOCUMENTS

| 5,933,849 | A * | 8/1999 | Srbljic et al. ................... 711/118 |
| 7,783,757 | B2 * | 8/2010 | Plamondon .................... 709/225 |
| 8,429,715 | B2 * | 4/2013 | Meren et al. ....................... 726/3 |
| 2006/0195660 | A1 * | 8/2006 | Sundarrajan et al. .......... 711/118 |

* cited by examiner

*Primary Examiner* — Chirag R Patel
(74) *Attorney, Agent, or Firm* — Ascenda Law Group, PC

(57) ABSTRACT

The present invention describes a system, method, and article of manufacture for resolving names received in network protocol requests by a network intermediary device coupled between a client network and a server network. A deferred trust model caching engine in the network intermediary device includes a transactor module configured to efficiently process a protocol request with a sequence of determinant criteria, although the sequence can occur in different orders. The deferred trust model caching engine includes a cacheability evaluator component configured to determine whether the protocol request is for a resource that the protocol permits to be cached by the network intermediate device, and a supplier trust evaluator component configured to compare information about the client's network protocol request and a cached object representation to determine if the object is trustworthy or not. The cached object representation associates an object with a supplier identity and a supplier trust property.

29 Claims, 5 Drawing Sheets

SYSTEM AND METHOD FOR OPTIMIZING NAME-RESOLUTION OVERHEAD IN A CACHING NETWORK INTERMEDIARY DEVICE

TECHNICAL FIELD

The present invention relates generally to network communications, and more particularly to systems and methods for applying heuristics to network intermediary devices (e.g., caching appliances) that provide a name resolution service.

BACKGROUND

Transparent network proxies aim to operate in a manner invisible to clients and/or servers, while providing benefit to client, server, an intermediate entity, or some combination thereof, for example to improve user experience or reduce upstream bandwidth. Servers in such networks generally are identified by stable and often mnemonic names, but traffic is routed by numeric allocated addresses. Clients and intermediate nodes can locate servers by resolving names to addresses using a "name resolution service". An example of such a service is the pervasive Domain Name Service (DNS), which can be employed to resolve Internet domain names to Internet Protocol version 4 (IPv4) and Internet Protocol version 6 (IPv6) addresses.

The mapping of name to address is not necessarily a one-to-one mapping. A given name may be serviced by multiple addresses, or conversely a single address may service many names. To be able to service many names from a single address, protocols may include name information in protocol messages. The Hypertext Transfer Protocol (HTTP) is an example of such a protocol in which a single IP address and service may provide content for a wide variety of service names. To facilitate this function, HTTP requests may include information about a domain name that is associated with the issued HTTP request.

When a message is transparently intercepted, the transmitting client does not know that the intermediary device is participating in the handling of the protocol message. In this scenario, the client performs its own name resolution to determine the remote service address. When the intermediary device views a client message which is a request for a network resource (an object), the intermediary knows from application-level information what domain name the client is requesting resources from. The proxy also knows what address the client believes this name resolves to. However, the intermediary may not be able to audit the client name resolution in progress, and thus the proxy cannot determine that this client resolution is trustworthy. For example, a client could intentionally construct a request with a false implied name resolution to confuse the proxy, or the client might be subject to a name resolution poisoning attack where a malicious intermediary agent provides a non-authoritative resolution to the client. Because the intermediary can only infer the name to address relationship from the protocol message, this type of mapping is termed the "implied client-resolved supplier address."

Caching intermediaries generally desire to cache resources by name rather than addresses for a variety of reasons: a single name might be resolved to many addresses; addresses are generally much less stable than names; and other, possibly protocol-specific reasons. Caching solutions generally tend to pick the most global and most stable naming for an object possible without loss of specificity.

Given that objects are obtained by address but often cached by name, proxies form an association between the addresses used to fetch objects and the names used for caching. If this association is made by simply trusting the implied client-resolved supplier address, the proxy is open to cache poisoning attacks, where clients forge requests to coerce the proxy to cache content from a non-authoritative source. For example, a request could be made for the front page image on a popular news site using the address for a personal server hosting obscene content. This type of attack would potentially cause other users using the same proxy to retrieve this poisoned content, seemingly from the official host. The onus is on the caching intermediary to ensure that the cached content served to clients meets a set of security, correctness, and constraint parameters.

One conventional approach to name resolution is a forced proxy resolution, which re-resolves the name in a request using a trusted resolution source. This means that the upstream source is always trusted, avoiding the potential of cache object poisoning as discussed above. The cost of name resolution for all proxied requests is potentially very high, not just in terms of client response time. The resolution requirements add complexity to proxy deployments and external resources which must be carefully managed. Failure in these external services degrades or interrupts service for clients.

Another common approach to name resolution is parallel caching, which caches a copy of the object for each address employed to fetch the object upstream, and simply employs the implied client-resolved supplier address. This avoids the intermediate cost and dependencies. Since each client receives content only according to their own resolution, then cross-client poisoning attacks using the intermediary as the vector are not possible. A potentially negative consequence here is that multiple identical copies of a given object may need to be cached, resulting in reduced beneficial caching and increased storage needs.

Therefore, it is desirable to design a caching network intermediary device that addresses cache poisoning attacks effectively and efficiently.

SUMMARY OF THE INVENTION

Embodiments of the present invention provide a system, method, and article of manufacture for resolving names received in network protocol requests by a network intermediary device coupled between a client network and a server network. A deferred trust model caching engine in the network intermediary device includes a transactor module configured to efficiently process a protocol request with a sequence of determinant criteria, although the sequence can occur in different orders. The deferred trust model caching engine includes a cacheability evaluator component configured to determine whether the protocol request is for a resource that the protocol permits to be cached by the network intermediary device, and a supplier trust evaluator component configured to compare information about the client's network protocol request and a cached object representation to determine if the object supplier is trustworthy or not. The cached object representation associates an object with a supplier identity and a trust property, where the supplier identity represents the specific address resolution used to obtain the object and where the trust property represents whether that resolution was performed by a source trusted by the proxy, or inferred via aspects of the client request. A name resolution module, communicatively coupled to the transactor module, to determine an authoritative list of supplier identities for the requested name if the prior checks of cacheability and trustworthiness of the object were unable to resolve the name request.

A method for name resolution in the network intermediary device is also provided. When an object is requested for which no cached object exists, the object can be fetched using the implied client-resolved supplier address, and marked as "untrusted" in persistent storage associated with the object. Similarly, requests which cannot be cached at all need no resolution and may employ the implied client-resolved supplier address, as nothing will be cached. When an object is requested that has an object marked as "trusted" in cache, this object can be obtained and served with normal name resolution logic and without considering the implied client-resolved supplier address. In some embodiments, if the object in cache is marked untrusted, it can be served if and only if the cached object supplier matches the implied client-resolved supplier address for the current request. If the untrusted object has a supplier that is not the same as the current request, then the object in cache is discarded, and the name resolved by the proxy directly. The object can then be fetched from one of the trusted resolution suppliers and cached as a trusted object. If the protocol in question permits a mechanism for strong cached content validation, then this mechanism could be employed with the trusted server to escalate the trust of the cached untrusted object rather than replacement.

As an optional feature, if the supplier of the object marked as untrusted is found to match one of the resolved addresses in the trusted resolution, then the object can simply be marked as a trusted object without replacement. In this case, a validation check with the trusted resolution supplier may be performed, if the protocol in question provides such a mechanism.

Broadly stated, in a network intermediary device, a computer-implemented method for name resolution comprising receiving an object by the network intermediary device that is transmitted between a client and a server, the object associated with a network protocol, an object name, a supplier identity, and one or more trust properties responsive to the resolution of the object name to the supplier identity; querying an object storage to determine if the object name associated with the object exists in the object storage; responsive to the object name associated with the object that exists in the object storage, examining the trust properties of the object to be obtained from a supplier of trusted resolution by the network intermediary device; and responsive to the object being an untrusted object, comparing the supplier identity of the object with an implied client-resolved supplier address by the network intermediary device.

Advantageously, the present invention is able to maintain safety parameters of a prior solution without the need to cache multiple copies of a given object. Additionally, the burden of resolutions performed by the network intermediary device is significantly reduced to specific scenarios, which field experience suggests may be less than 30% of requests, for a reduction of at least 70%. Furthermore, the reduction of dependency on trusted resolution results in potentially improved client responsiveness, and reduced demand on resolution infrastructure, thus improving solution robustness and decreasing deployment complexity.

The structures and methods of the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The present invention is illustrated by way of example to specific embodiments, and not limitation, in the figures of the accompanying drawings in which.

DETAILED DESCRIPTION

Figure 1:
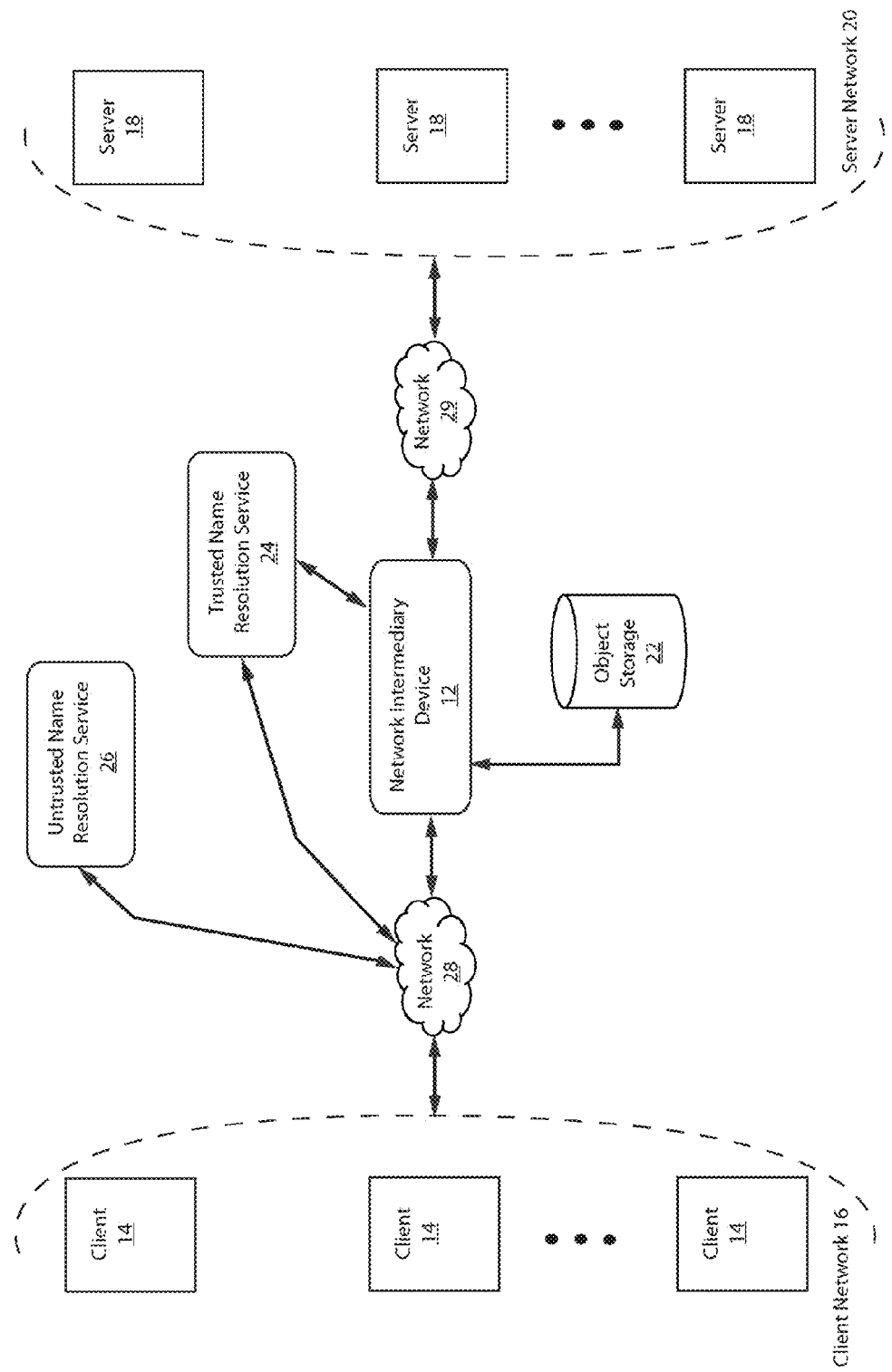
FIG. 1 is a block diagram illustrating a client/server network having a network intermediary device configured in accordance to one embodiment of the present invention.

A description of structural embodiments and methods of the present invention is provided with reference to FIGS. 1-5. It is to be understood that there is no intention to limit the invention to the specifically disclosed embodiments but that the invention may be practiced using other features, elements, methods and embodiments. Like elements in various embodiments are commonly referred to with like reference numerals.

FIG. 1 is a block diagram illustrating a client/server network 10 utilizing a network intermediary device 12. The network system 10 comprises any number of client devices 14, collectively referred as a client network 16, connected to the network intermediary device 12 via a network 28. A client device 14 ("client") is a computing device capable of making a request (e.g., for an object, service, etc.) over the network 28 and receiving a response for the request. For instance, the client 14 may be a personal computer (PC), a hand-held device or personal digital assistant (PDA) type device, a mobile phone, a tablet computer, etc. In one embodiment, the client is a PC running a web browser application and may make requests for objects over the network 28 by utilizing the web browser. Each client device is coupled to the network intermediary device using a client communication path that can include a dial-up connection, a LAN, a WAN, an IP network (such as an internet, intranet, or extranet), or some combination thereof. As used herein, the terms "client" and "server" refer to relationships between the client or server and the network intermediary device, not necessarily to particular physical devices. As used herein, the term "client device" includes any device taking on the role of a client in a client-server environment. There is no particular requirement that the client devices 14 must be individual devices; they can each be a single device, a set of cooperating devices, a portion of a device, or some combination thereof.

The network intermediary device 12 is a computing device capable of receiving and responding to the request made by the client 14. In one embodiment, the network intermediary device 12 is a cache appliance with an internal object store housing objects that may be requested by the client 14. The network intermediary device is communicatively coupled to any of a number of content servers 18, collectively referred to as a server network 20, via a network 29. Messages are transmitted between the client 14 and the server 18. A message may contain "objects" or "resources", which are named chunks of data, or may include requests for such objects, or portions of those objects, or a combination of objects and requests for objects.

Networks 28 and 29 may be distinctly separate networks or the same (or portions of the same) network and may be any kind of networks known in the art. For instance, networks 28 and 29 may be private networks, such as intranets, extranets, local area networks (LANs), or wide area networks (WANs). Networks may also be (in whole or in part) public networks, such as the Internet. Furthermore, many computer devices have multiple network interfaces and, thus, networks 28 and 29 may contain multiple upstream or downstream networks of wired and/or wireless segments. Nevertheless, in the interest of brevity, networks 28 and 29 hereafter is referred to by the general term "network" to mean any kind of medium over which the client 14 and the network intermediary device 12 communicate.

Servers 18 provide content to the network intermediary device 12. The purpose of the plurality of servers 18 is to provide a requested object to the network intermediary device 12 when the network intermediary device 12 does not have the object in its object store. The network intermediary device 12 has the ability to query any one of the plurality of servers 18 for the object. Servers 18 are computer devices that can receive the query and respond in kind with the requested object. Each server device is coupled to the network intermediary device using a server communication path that can include a dial-up connection, a LAN, a WAN, an IP network or some combination thereof. In one embodiment, the server communication path includes an internet backbone and an internet connection between the network intermediary device and the internet backbone. As used herein, the term "server device" includes any device taking on the role of a server in a client-server environment, or to any device transmitting objects in a peer-to-peer environment. There is no particular requirement that the server devices 18 must be individual devices; they can each be a single device, a set of cooperating devices, a portion of a device, or some combination thereof. Generally, a server device includes memory or storage for recording one or more web objects, which can be any type of data suitable for transmitting to the client device 14 (e.g., text, color, formatting and directions for display; pictures, data in graphical formats (such as GIF or JPEG), other multimedia data; animation, audio (such as streaming audio), movies, and video (such as streaming video), and other data in audio or visual formats (such as MPEG); program fragments, including applets, Java, JavaScript, and ActiveX; and other web documents and data types).

An object storage 22 is coupled to the network intermediary device 12 for managing and storing objects. Data received by the object storage 22 is organized into flexible-sized data containers, which are also referred to as objects. Each object has a first portion containing data, which is an uninterpreted sequence of bytes, and a second portion containing metadata, which is an extensible set of attributes describing the object. A trusted name resolution service 24 and an untrusted name resolution service 26 are coupled to the network intermediary device 12 to resolve domain names to their corresponding Internet Protocol (IP) addresses as originated from a trusted source or an untrusted source. In this context, a supplier address is considered trusted if the name is resolved to that address using a trusted name resolution service. Name resolution services are trusted if they are under the administrative control of the customer or a trusted partner organization. Untrusted resolutions are resolutions that occur outside the customer organizations view and/or control. In one embodiment, the trusted name resolution service 24 is implemented with a customer-configured DNS server.

In some embodiments of the present invention, nodes (which referred to clients 14 and the server 18) on either side of the network intermediary device 12 may act as clients and servers. The network intermediary device 12 may connect to multiple networks, on which nodes may exist that act as both 'requestors' and 'responders', potentially at the same time, depending on the nature of the network protocols or application protocols being used for information exchange.

In some embodiments of this invention, nodes on either side of the network intermediary device 12 may act as clients and servers, and the network intermediary device 12 may connect to one or more networks, on which nodes may exist that act as both 'requestors' and 'responders', potentially at the same time, depending on the nature of the network protocols (also referred to as "application protocols" where an application protocol may be a specific class of the network protocol) being used for information exchange. There are various types of network protocols as specified by Open Systems Interconnection (OSI) model layers, which include the Hypertext Transfer Protocol (HTTP), the File Transfer Protocol (FTP), and the Real Time Streaming Protocol (RTSP).

Figure 2:
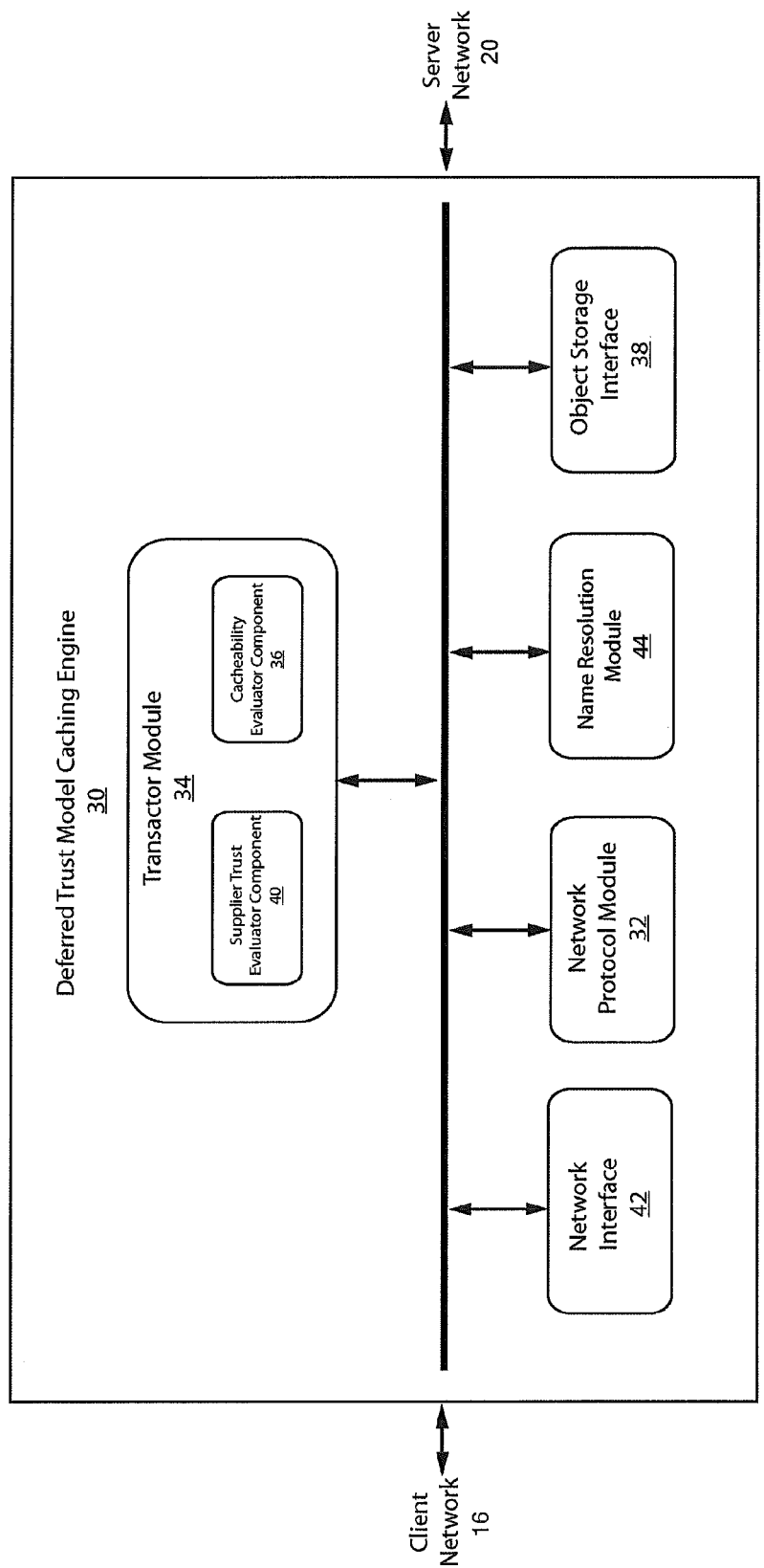
FIG. 2 is a block diagram illustrating a deferred trust model caching engine that resides in the network intermediary device in accordance to one embodiment of the invention.

FIG. 2 is a block diagram illustrating a deferred trust model caching engine 30 that resides in the network intermediary device 12. The deferred trust model caching engine 30 includes a network interface 42 for communicating with clients 14 in the client network 16 and servers 18 in the server network 20. A network protocol module (also referred to as an "application protocol module") 32 interprets or decodes the network protocols used by the clients 14 and servers 18 to transmit data objects, and presents the transactional data to a transactor module 34. The transactor module 34 includes a cacheability evaluator component 36 to determine whether transmitted objects can be stored in the object storage 22 via an object storage interface 38 for use in subsequent client transactions. The transactor module 34 further includes a supplier trust evaluator component 40 to determine when and how stored objects can be served to clients 14 without risk of sending compromised content to uncompromised clients. The supplier trust evaluator component 40 is configured to make this determination by comparing information about the client's network protocol request (made available via the network interface 42), the object storage interface 38, meta information (see FIG. 3) and potentially the authoritative name resolution made available via a name resolution module 44.

Figure 3:
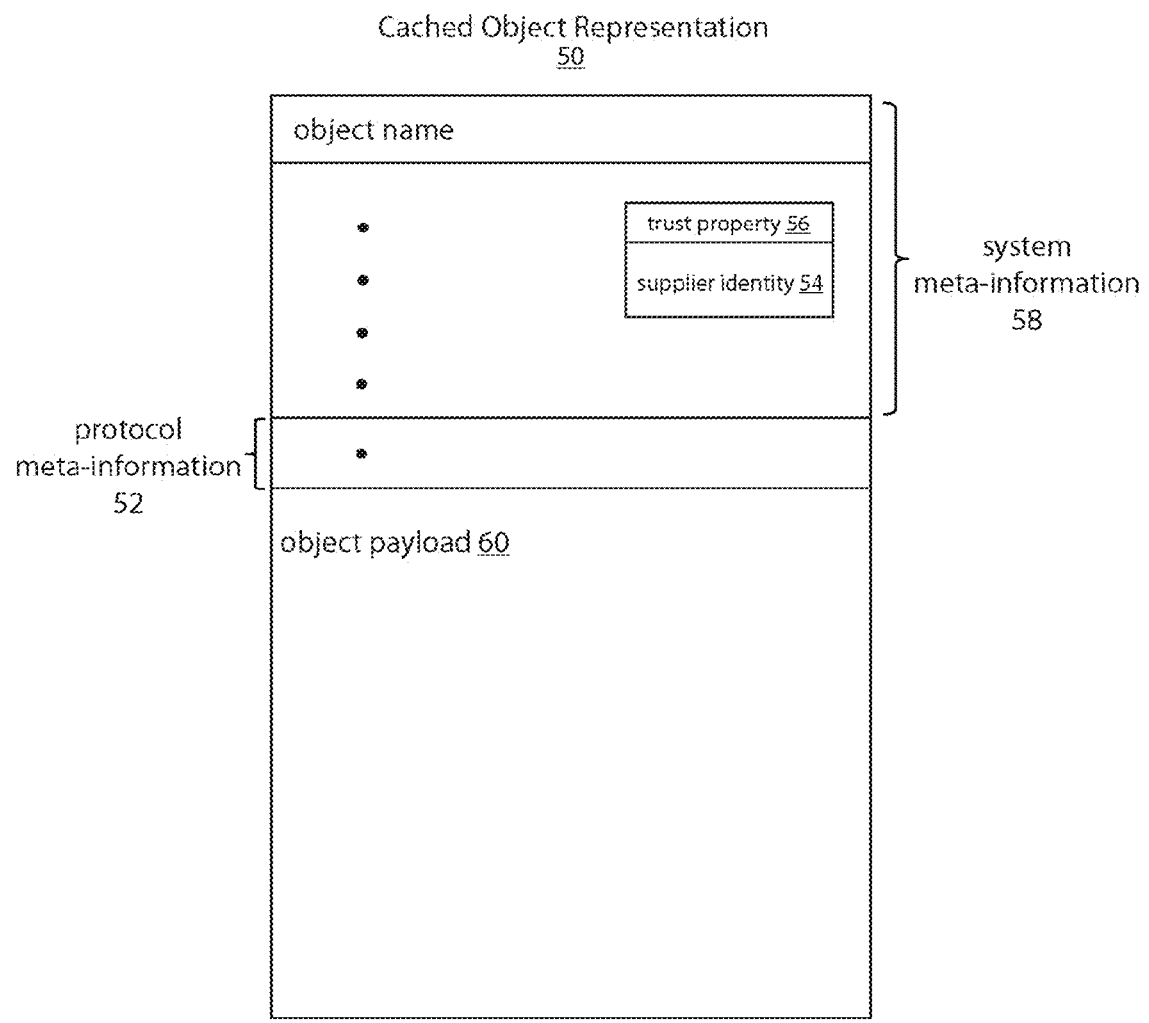
FIG. 3 is a sample diagram illustrating a cached object representation in accordance with an embodiment of the present invention.

FIG. 3 is a sample diagram illustrating a cached object representation 50 in accordance with an embodiment of the present invention. In order for the supplier trust evaluator module 40 to make decisions about object utility, stored objects have associated meta-information 52 that includes identity information about an object supplier (or "supplier identity") 54 and information about how the supplier was determined when a given version of an object was initially obtained (a "trust property" or "trust properties" 56). This information may be stored with the object, as illustrated in FIG. 3, or it may be stored in a separate index which is accessible to the supplier trust evaluation module 40 and which maintains a mapping of system meta-information 58 to object payload 60.

Figure 4:
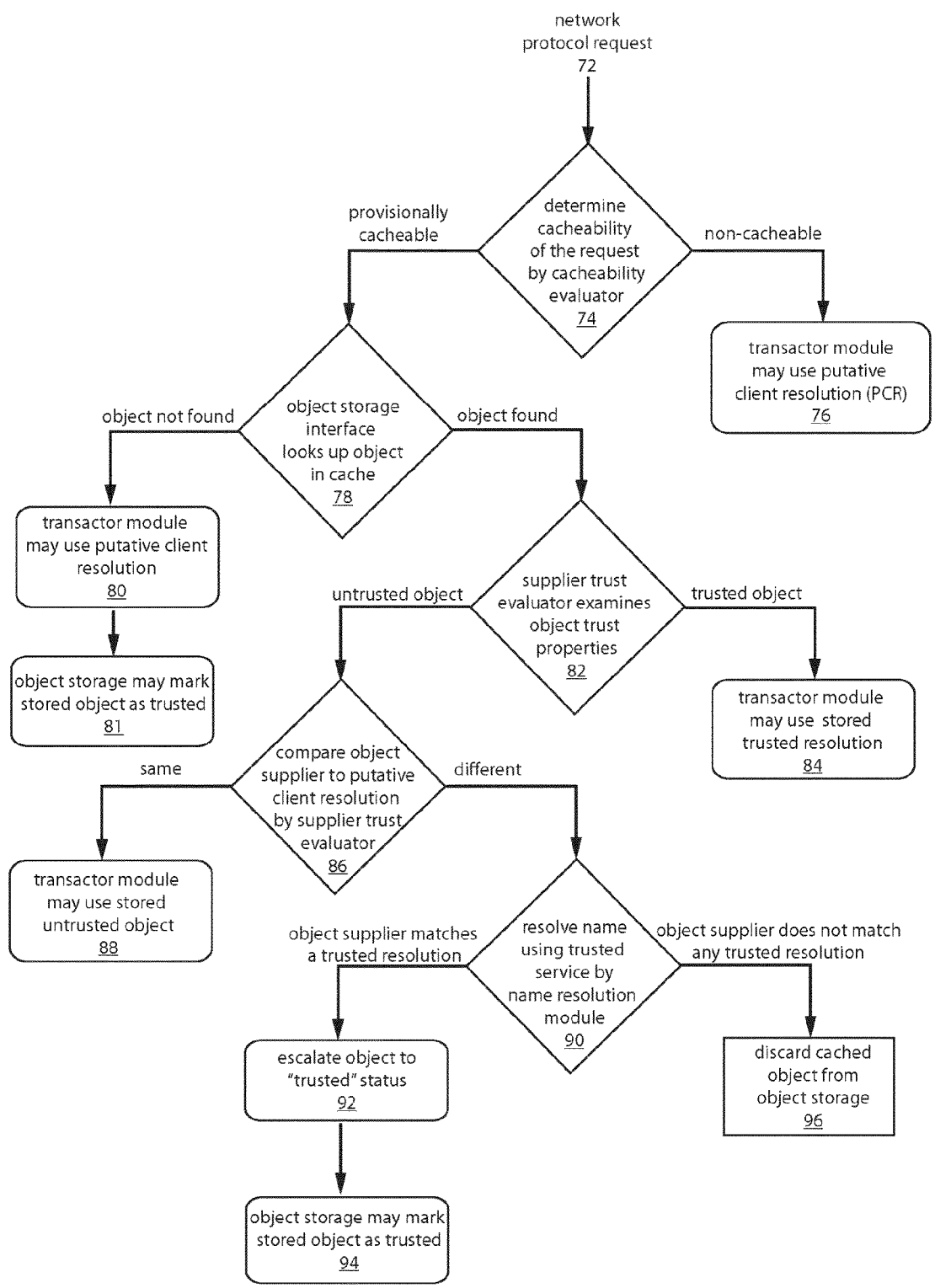
FIG. 4 is a flow diagram illustrating the process of the deferred trust model caching engine in the network intermediary device in accordance with an embodiment of the present invention.

FIG. 4 is a flow diagram illustrating the process of the deferred trust model caching engine 30 in the network intermediary device 12. At step 72, when the network intermediary device 12 participates in a client network protocol request, either by intercepting the request and acting as a remote agent, or by auditing the request as the request flows through the network intermediary device 12 en route to the server network 20, the network protocol module 32 is configured to interpret the protocol request, and presents the protocol request to the transactor module 34. At step 74, the cacheability evaluator component 36 in the transactor module 34 is configured to determine whether the request is for a resource that the protocol permits to be cached by the network intermediate device 12 (or a plurality of network intermediate nodes) at step 74. This cacheability determination may have protocol-specific considerations that require collaborations with the network protocol module 32. Cacheability as determined in step 74 may be conventional, as a standardized aspect of the network protocol, or it may be an observed property of the protocol that is not explicitly permitted by the network protocol, or it may be determined using a cacheability heuristic or statistical means, or lastly it may be determinable via a combination of all of these considerations. The determination of cacheability at step 74 may be provisional, and may need to be altered by the nature of the response or response payload.

On the one hand, as an optional process, if the cacheability evaluator component 36 determines that the request is non-cacheable, at step 76, then the transactor module 34 is configured to use the implied client-resolved supplier address, as exposed to the transactor module 34 by the network protocol module 32. This occurs because no object is obtained from or placed in the object storage 22 via the object storage interface 38, and thus there is no opportunity for a compromised stored object to be provisioned to the requesting client.

On the other hand, as an optional step, if the cacheability evaluator component 36 determines that the request is provisionally cacheable, at step 78, then the transactor module 34 is configured to query the object storage 22 via the object storage interface 38 using the object name determined from the request by the network protocol module 32. If the object storage interface 38 does not find the object in the object storage 22, at step 80, then the transactor module 34 is configured to avoid trusted name resolution, and may obtain the object via the implied client-resolved supplier address as determined by the network protocol module 32. In this case, the object may be stored, but the object is marked with the supplier identifier 54 and trust properties 56 at step 81.

If the object storage interface 38 locates an object with the determined name, and the object is determined to be usable to directly or partially satisfy the client request per logic potentially specific to the protocol and mediated via the network protocol module 32, at step 82, the supplier trust evaluator component 40 is configured to examine the object trust properties 56 and the supplier identifier 54 as retrieved from the object storage 22 via the object storage interface 38.

If the supplier trust evaluator component 40 determines that the trust property 56 as obtained in step 82 indicates that the object was obtained from a supplier that was validated as an authoritative supplier for the name associated with the object, then the object can be considered to have a "trusted supplier" and thus be a "trusted object" at step 84. The transactor module 34 may use the stored trusted resolution associated with the object to satisfy the client request as deemed appropriate by the network protocol module 32.

If the supplier trust evaluator component 40 determines that the trust property 56 as obtained in step 82 indicates that the object was obtained from a non-validated supplier, then the transactor module 34 is configured to compare the supplier with the implied client-resolved supplier identity at step 86 as exposed by the network protocol module 32. If the supplier identities are the same, at step 88, then the transactor module 34 may use the stored object to satisfy the client request as deemed appropriate by the network protocol module 32, as the object is from a source trusted by the client, even though the supplier trust evaluator component 40 identifies the object as untrusted at step 82.

At step 86, if the supplier trust evaluator component 40 determines that the object supplier identity and the implied client-resolved supplier identity (also referred to as "implied client-resolved supplier address") do not match, then the transactor module 34 is configured to use the name resolution module 44 to determine the authoritative list of supplier identities for the requested name at step 90.

If the transactor module 34 determines that the stored object supplier identity 54 is one of the authoritative suppliers, then the transactor module 34 escalates the object to trusted status at step 92. At step 94, the transactor module 34 may mark the stored object as having a trusted supplier and may then be used to satisfy the client request as deemed appropriate by the network protocol module 32. As an optional step at step 94, the object storage interface 38 is configured to mark stored object as trusted object.

If the transactor module 34 determines that the stored object supplier identity 54 is not one of the authoritative suppliers, then the stored object is discarded at step 96 or otherwise prohibited from being used to satisfy the client request. The client request may then be satisfied either by the client's requested supplier, or from one of the authoritative suppliers.

Figure 5:
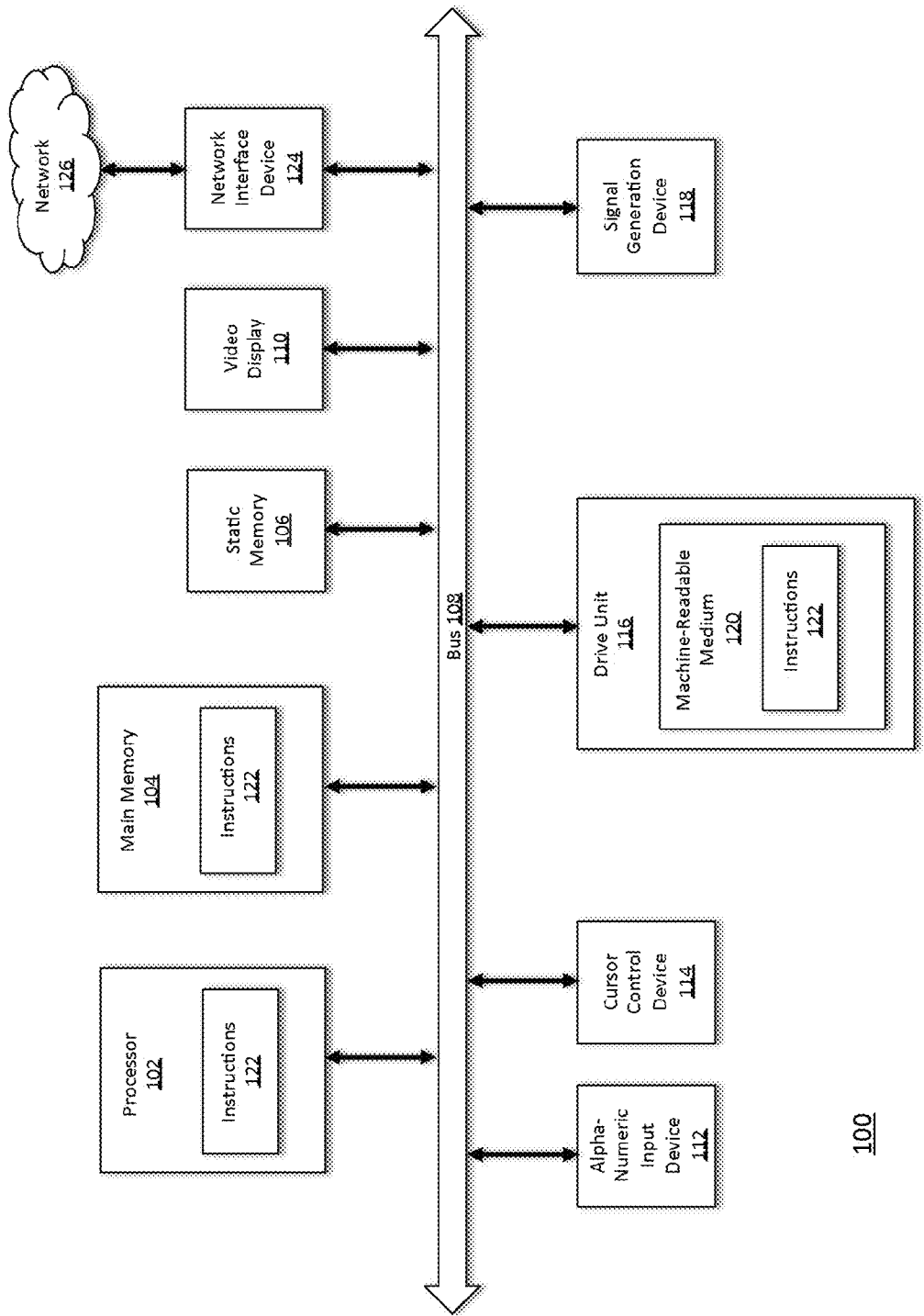
FIG. 5 is a block diagram illustrating an example of a computer device on which computer-executable instructions to perform the methodologies discussed herein may be installed and run.

As alluded to above, the various computer-based devices discussed in connection with the present invention may share similar attributes. FIG. 5 illustrates an exemplary form of a computer system 100, in which a set of instructions can be executed to cause the computer system to perform anyone or more of the methodologies discussed herein. The computer devices 100 may represent any or all of the clients 14, servers 18, or network intermediary devices 12 discussed herein. Further, while only a single machine is illustrated, the term "machine" shall also be taken to include any collection of machines that individually or jointly execute a set (or multiple sets) of instructions to perform any one or more of the methodologies discussed herein. The exemplary computer system 100 includes a processor 102 (e.g., a central processing unit (CPU), a graphics processing unit (GPU), or both), a main memory 104 and a static memory 106, which communicate with each other via a bus 108. The computer system 100 may further include a video display unit 110 (e.g., a liquid crystal display (LCD)). The computer system 100 also includes an alphanumeric input device 112 (e.g., a keyboard), a cursor control device 114 (e.g., a mouse), a disk drive unit 116, and a signal generation device 118 (e.g., a speaker) and a network interface device 124.

The disk drive unit 116 includes a machine-readable medium 120 on which is stored one or more sets of instructions (e.g., software 122) embodying anyone or more of the methodologies or functions described herein. The software 122 may also reside, completely or at least partially within the main memory 104 and/or within the processor 102 during execution thereof the computer system 100, the main memory 104, and the instruction-storing portions of processor 102 also constituting machine-readable media. The software 122 may further be transmitted or received over a network 126 via the network interface device 124.

While the machine-readable medium 120 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform anyone or more of the methodologies of the present invention. The term "machine-readable medium" shall accordingly be taken to include, but not be limited to, solid-state memories, and optical and magnetic media.

Some portions of the detailed descriptions that follow are presented in terms of algorithms and symbolic representations of operations on data within a computer memory or other storage device. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), erasable programmable ROMs (EPROMs), electrically erasable and programmable ROMs (EEPROMs), magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

Moreover, terms such as "request", "client request", "requested object", or "object" may be used interchangeably to mean action(s), object(s), and/or information requested by a client from a network device, such as an intermediary or a server. In addition, the terms "response" or "server response" may be used interchangeably to mean corresponding action(s), object(s) and/or information returned from the network device. Furthermore, the terms "communication" and "client communication" may be used interchangeably to mean the overall process of a client making a request and the network device responding to the request.

The present invention has been described in particular detail with respect to possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. The system may be implemented via a combination of hardware and software, as described, or entirely in hardware elements, or entirely in software elements. The particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

As used herein, any reference to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

An ordinary artisan should require no additional explanation in developing the methods and systems described herein but may nevertheless find some possibly helpful guidance in the preparation of these methods and systems by examining standard reference works in the relevant art.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. The terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

What is claimed and desired to be secured by Letters Patent of the United States is:

1. A computer-implemented method for a network intermediary device communicatively coupled to a client and a server, the method comprising:
    receiving by the network intermediary device a request for an object, the object request associated with a network protocol;
    querying an object storage to determine whether the object, as identified by an object name determined from the object request, is stored in the object storage;
    responsive to the object being stored in the object storage, examining one or more trust properties of the object to determine whether the object was obtained from a supplier trusted by the network intermediary device; and
    responsive to the object being obtained from a supplier not trusted by the network intermediary device, comparing an identity of the supplier with an implied client-resolved supplier address to determine whether the supplier identity matches the implied client-resolved supplier address.

2. The computer-implemented method as recited in claim 1, further comprising, determining, prior to the querying step, whether the object is cacheable, the object being cacheable if the associated network protocol permits the object to be cached by the network intermediary device.

3. The computer-implemented method as recited in claim 1, further comprising, if the supplier identity of the object does not match the implied client-resolved supplier address, determining, after the comparing step, an authoritative list of supplier identities.

4. The computer-implemented method as recited in claim 1, wherein the receiving step comprises intercepting the object request by the network intermediary device.

5. The computer-implemented method as recited in claim 1, wherein the receiving step comprises auditing the object request while the object request flows through the network intermediary device en route to the server.

6. The computer-implemented method as recited in claim 1, wherein the network intermediary device acts as a remote agent disposed between the client and the server.

7. The computer-implemented method as recited in claim 2, wherein the object is determined to be cacheable if the associated network protocol is a standardized protocol.

8. The computer-implemented method as recited in claim 2, wherein the object is determined to be non-cacheable if the associated network protocol has an observed property that is not permitted by a network protocol module in the network intermediate device.

9. The computer-implemented method as recited in claim 2, wherein determining whether the object is cacheable comprises using a cacheability heuristic or statistical means.

10. The computer-implemented method as recited in claim 2, wherein determining whether the object is cacheable comprises a combination of determining whether the associated network protocol is a standardized protocol, determining whether the associated network protocol has an observed property that is not permitted by a network protocol module in the network intermediate device, and using a cacheability heuristic or statistical means.

11. The computer-implemented method as recited in claim 2, further comprising, if the object is determined to be non-cacheable, employing the implied client-resolved supplier address on the object request.

12. The computer-implemented method as recited in claim 1, further comprising, if the object is stored in the object storage, certifying the object is usable for a direct communication between the client and the server.

13. The computer-implemented method as recited in claim 1, further comprising, if the object is stored in the object storage, certifying the object partially satisfies a policy logic as set forth in a network protocol module in the network intermediary device.

14. The computer-implemented method as recited in claim 1, further comprising, if the object is stored in the object storage, retrieving the one or more trust properties and the supplier identity associated with the object from the object storage.

15. The computer-implemented method as recited in claim 1, further comprising, if the object is not stored in the object storage, employing the implied client-resolved supplier address to obtain the object from the untrusted supplier.

16. The computer-implemented method as recited in claim 15, further comprising marking the object stored in the object storage with the supplier identifier and the one or more trust properties.

17. The computer-implemented method as recited in claim 1, further comprising, if the supplier identity of the object matches the implied client-resolved supplier address, retrieving, after the comparing step, the object from the object storage to fulfill the object request.

18. The computer-implemented method as recited in claim 3, further comprising, if the supplier identity of the object does not match any supplier identities from the authoritative list of supplier identities, discarding the object from the object storage.

19. The computer-implemented method as recited in claim 3, further comprising, if the supplier identity of the object matches any supplier identities from the authoritative list of supplier identities, escalating the object to a trusted status.

20. The computer-implemented method as recited in claim 19, further comprising, if the supplier identity of the object matches any supplier identities from the authoritative list of supplier identities, marking the object as associated with a trusted supplier.

21. The computer-implemented method as recited in claim 1, wherein the object is embodied in an electronic message.

22. The computer-implemented method as recited in claim 1, wherein the object comprises a HyperText Transfer Protocol (HTTP) message.

23. The computer-implemented method as recited in claim 1, wherein the object comprises a HyperText Transfer Protocol (HTTP) response message, and wherein the object name comprises a Uniform Resource Identifier (URI).

24. The computer-implemented method as recited in claim 1, wherein the object comprises a HyperText Transfer Protocol (HTTP) response message, and wherein the object name comprises a Uniform Resource Identifier (URI) and additional representation information.

25. The computer-implemented method as recited in claim 1, wherein the object comprises a portion of a HyperText Transfer Protocol (HTTP) response message, and wherein the object name comprises a Uniform Resource Identifier (URI).

26. The computer-implemented method as recited in claim 1, wherein the object comprises a portion of a HyperText Transfer Protocol (HTTP) response message, and wherein the object name comprises a Uniform Resource Identifier (URI) and additional representation information.

27. The computer-implemented method as recited in claim 1, wherein the network intermediary device comprises a HyperText Transfer Protocol (HTTP) caching proxy device.

28. A network intermediary device disposed between a client network and a server network, the network intermediary device comprising:
- a processor;
- a storage device communicatively coupled to the processor; and
- a set of instructions on the storage device that, when executed by the processor, cause the processor to:
  - receive a request for an object, the object request associated with a network protocol;
  - query an object storage to determine whether the object, as identified by an object name determined from the object request, is stored in the object storage;
  - responsive to the object being stored in the object storage, examine one or more trust properties of the object to determine whether the object was obtained from a supplier trusted by the network intermediary device; and
  - responsive to the object being obtained from a supplier not trusted by the network intermediary device, compare an identity of the supplier with an implied client-resolved supplier address to determine whether the supplier identity matches the implied client-resolved supplier address.

29. A computer program product comprising a non-transitory computer readable storage medium structured to store instructions, that when executed by a processor, cause the processor to:
- receive a request for an object, the object request associated with a network protocol;
- query an object storage to determine whether the object, as identified by an object name determined from the object request, is stored in the object storage;
- responsive to the object being stored in the object storage, examine one or more trust properties of the object to determine whether the object was obtained from a supplier trusted by a network intermediary device; and
- responsive to the object being obtained from a supplier not trusted by the network intermediary device, compare an identity of the supplier with an implied client-resolved supplier address to determine whether the supplier identity matches the implied client-resolved supplier address.

* * * * *